United States Patent
Watanabe et al.

(10) Patent No.: US 6,748,166 B2
(45) Date of Patent: Jun. 8, 2004

(54) LENS-BARREL AND CAMERA SYSTEM HAVING THE LENS-BARREL

(75) Inventors: Tsuneo Watanabe, Nakano-ku (JP); Koshi Yoshibe, Kawasaki (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 10/641,012

(22) Filed: Aug. 15, 2003

(65) Prior Publication Data
US 2004/0037545 A1 Feb. 26, 2004

(30) Foreign Application Priority Data
Aug. 22, 2002 (JP) ......................................... 2002-242048

(51) Int. Cl.$^7$ ............................................. G03B 13/32
(52) U.S. Cl. ...................... 396/79; 396/137; 348/240.3; 348/345
(58) Field of Search .......................... 396/79–83, 137; 359/694, 823, 824, 825; 348/240.3, 345, 347

(56) References Cited

U.S. PATENT DOCUMENTS

| | | | |
|---|---|---|---|
| 5,477,387 A | 12/1995 | Takayama | 359/694 X |
| 5,572,373 A * | 11/1996 | Imanari et al. | 359/825 |
| 5,918,078 A * | 6/1999 | Imura et al. | 396/137 |
| 6,456,796 B1 * | 9/2002 | Tanaka et al. | 396/131 |
| 6,580,571 B2 * | 6/2003 | Sasaki et al. | 359/823 |

* cited by examiner

Primary Examiner—W. B. Perkey
(74) Attorney, Agent, or Firm—Oliff & Berridge PLC (57) ABSTRACT

A lens-barrel and a camera system including the lens-barrel are in an automatic focus mode in which a focusing unit is automatically driven by an automatic focus unit, during a time when a manual operation member is not operated. When the manual operation member is operated in a second direction, switching is done to a manual focus mode achieving focus by operation of the manual operation member in the second direction. However, when detecting the operation of the manual operation member in the second direction during a zoom operation in which the manual operation member is being operated in a first direction, switching is done to the automatic focus mode without being switched to the manual focus mode. Therefore, unintentional switching from the automatic focus mode to the manual focus mode during the zoom operation can be reliably prevented.

12 Claims, 6 Drawing Sheets

LENS-BARREL AND CAMERA SYSTEM HAVING THE LENS-BARREL

CROSS-REFERENCE TO RELATED APPLICATIONS

This application is based upon and claims the benefit of priority from the prior Japanese Patent Application No. 2002-242048, filed on Aug. 22, 2002, the entire contents of which are incorporated herein by reference.

BACKGROUND OF THE INVENTION

1. Field of the Invention

The present invention relates to a lens-barrel of a camera or the like, and especially to a lens-barrel of sliding-type zooming lens or the like and a camera system having the lens-barrel.

2. Description of the Related Art

Conventionally known is a lens-barrel of so-called double-operation type, which performs a focus operation and a zoom operation by rotationally operating different operation members.

In this lens-barrel, an automatic focus is performed when a focus operation ring does not rotate, and a manual focus is performed by rotating the focus operation ring. Further, a zoom operation is performed by rotating a zoom operation ring.

However, with such lens-barrel of double-operation type, an operator must shift his/her hand on the lens-barrel to switch between the zoom operation and the focus operation when taking a picture, since the focus operation and the zoom operation are performed by rotationally operating the different operation members. Because of this, it is impossible to switch between the zoom operation and the focus operation quickly, causing a complicated operation.

On the other hand, also conventionally known is a lens-barrel of so-called single-operation type, which has one or two operation member(s), performs zooming by sliding operation in the optical axis direction of the operation member, and performs a manual focus by the rotational operation about the optical axis.

With such lens-barrel of single-operation type, the operator does not need to shift his/her hand on the lens-barrel to switch between the zoom operation and the manual focus operation when taking a picture. Therefore, it is possible to switch between the zoom operation and the manual focus operation quickly, resulting in a simple operation.

However, with such lens-barrel of single-operation type, a hand of the operator who takes a picture is always on the operation member for performing the focus operation and the zoom operation. Therefore, there has been a problem of possibly developing an out-of-focus picture with the lens-barrel which switches from the automatic focus mode to the manual focus mode automatically by the rotation of the operation member.

That is, if the operator unintentionally rotates the operation member during the zoom operation which is the sliding operation of the operation member in the optical axis direction, it causes switching from the automatic focus mode to the manual focus mode automatically. Then, photographing is performed in such a state that the focus cannot be refocused, and thus possibly causing a problem of developing an out-of-focus picture.

SUMMARY OF THE INVENTION

It is an object of the present invention to reliably prevent unintentional switching from an automatic focus mode to a manual focus mode during a zoom operation.

According to one of the aspects of the present invention, the lens-barrel includes a photographing optical system, a zooming unit for moving a variable power lens of the photographing optical system in an optical axis direction of the photographing optical system to vary a focal length, a focusing unit for moving a focusing lens of the photographing optical system in the optical axis direction to achieve focus, a manual operation member being operated in a first direction to thereby allow the zooming unit to be operable and operated in a second direction to thereby allow the focusing unit to be operable, the second direction being different from the first direction, an automatic focus unit for driving the focusing unit to focus the photographing optical system without operating the manual operation member, a zoom operation detecting unit for detecting the operation of the manual operation member in the first direction, a focus operation detecting unit for detecting the operation of the manual operation member in the second direction, and a control unit being capable of switching a way of achieving the focus from the automatic focus unit's operation to the manual operation member's operation in the second direction, when detecting that the manual operation member is operated in the second direction during the automatic focus unit's operation. The control unit does not perform the switching while the zoom operation detecting unit detects driving of the zooming unit, even when detecting the operation of the manual operation member in the second direction. That is, when the manual operation member is not operated, the control unit is in the automatic focus mode in which the focusing unit is automatically driven by the automatic focus unit. When the manual operation member is operated in the second direction, the control unit comes to be in the manual focus mode achieving focus by the operation of the manual operation member in the second direction. However, when detecting the operation of the manual operation member in the second direction during the zoom operation in which the manual operation member is being operated in the first direction, the control unit comes to be in the automatic focus mode without switching to the manual focus mode. Therefore, unintentional switching from the automatic focus mode to the manual focus mode can be reliably prevented.

According to another aspect of the present invention, the lens-barrel includes a photographing optical system, a zooming unit for moving a variable power lens of the photographing optical system in an optical axis direction of the photographing optical system to vary a focal length, a focusing unit for moving a focusing lens of the photographing optical system in the optical axis direction to achieve focus, a manual operation member being operated in a first direction to thereby allow the zooming unit to be operable and operated in a second direction to thereby allow the focusing unit to be operable, the second direction being different from the first direction, an automatic focus unit for driving the focusing unit to focus the photographing optical system without operating the manual operation member, a zoom operation detecting unit for detecting the operation of the manual operation member in the first direction, a focus operation detecting unit for detecting the operation of the manual operation member in the second direction, and a control unit being capable of switching a way of achieving the focus from the automatic focus unit's operation to the manual operation member's operation in the second direction, when detecting that the manual operation member is operated in the second direction during the automatic focus unit's operation. The focus operation detecting unit can measure an operational amount of the manual operation member in the second direction, and while the zoom operation detecting unit detects driving of the zooming unit, the control unit does not perform the switching until the focus operation detecting unit determines that the operational amount of the manual operation member in the second direction has exceeded a predetermined amount. That is, while the zoom operation detecting unit detects driving of the zooming unit, the switching to the manual focus mode is not performed until the focus operation detecting unit determines that the operational amount of the manual operation member in the second direction has exceeded the predetermined amount. Therefore, as long as the operational amount of the manual operation member in the second direction does not exceed the predetermined amount, that is, as long as an operator does not operate the manual operation member intentionally, the switching to the manual focus mode does not occur. Thus, unintentional switching from the automatic focus mode to the manual focus mode can be effectively prevented.

According to another aspect of the present invention, the first direction of the manual operation member is the optical axis direction, and the second direction of the manual operation member is a direction in which the manual operation member rotates about the optical axis of the photographing optical system. The zoom operation is performed by moving the manual operation member in the optical axis direction, and the manual focus operation is performed by rotating the manual operation member. Therefore, since the operator does not need to shift his/her hand on the lens-barrel to switch between the zoom operation and the manual focus operation when taking a picture, it is possible to perform the switching quickly, resulting in simple operation.

According to another aspect of the present invention, the automatic focus unit drives the focusing unit by an ultrasonic motor which includes a stator composed of a piezoelectric element and an elastic body with its surface elliptically moving by vibrations created by the piezoelectric element, and a rotor which adjoins the stator and is moved rotationally by the vibrations of the stator. The ultrasonic motor has characteristics that it is small in size and light in weight, has no magnetism, has excellent responsiveness, and can obtain a high torque even in low-speed, thereby being capable of achieving the automatic focus immediately with high accuracy.

According to another aspect of the present invention, the focus operation detecting unit includes a printed-circuit board and brushes being pressured by the printed-circuit board to make sliding contact with a plurality of electrical conductor patterns arranged on the printed-circuit board one after another, the electrical conductor patterns being arranged on a periphery of the printed-circuit board with intervals of predetermined pitches, and the focus operation detecting unit detects the operation of the manual operation member in the second direction. That is, the operational amount of the manual operation member in the second direction is measured by having the brushes pressured and made sliding contact with the electrical conductor patterns being arranged on the periphery of the printed-circuit board with intervals of predetermined pitches. Therefore, the operational amount of the manual operation member in the second direction can be reliably measured with high accuracy.

According to another aspect of the present invention, the zoom operation detecting unit includes a printed-circuit board and brushes being pressured by the printed-circuit board to make sliding contact with a plurality of electrical conductor patterns arranged on the printed-circuit board one after another, the electrical conductor patterns being arranged on a periphery of the printed-circuit board with intervals of predetermined pitches, and the zoom operation detecting unit detects the operation of the manual operation member in the first direction. That is, the operational amount of the manual operation member in the first direction is measured by having the brushes pressured and made sliding contact with the electrical conductor patterns being arranged on the periphery of the printed-circuit board with intervals of predetermined pitches. Therefore, the operational amount of the manual operation member in the first direction can be reliably measured with high accuracy.

According to another aspect of the present invention, a camera system has a lens-barrel and a camera body to which the lens-barrel is attached. The lens-barrel includes a photographing optical system, a zooming unit for moving a variable power lens of the photographing optical system in an optical axis direction of the photographing optical system to vary a focal length, a focusing unit for moving a focusing lens of the photographing optical system in the optical axis direction to achieve focus, a manual operation member being operated in a first direction to thereby allow the zooming unit to be operable and operated in a second direction to thereby allow the focusing unit to be operable, the second direction being different from the first direction, an automatic focus unit for driving the focusing unit to focus the photographing optical system without operating the manual operation member, a zoom operation detecting unit for detecting the operation of the manual operation member in the first direction, a focus operation detecting unit for detecting the operation of the manual operation member in the second direction, and a control unit being capable of switching a way of achieving the focus from the automatic focus unit's operation to the manual operation member's operation in the second direction, when detecting that the manual operation member is operated in the second direction during the automatic focus unit's operation. The control unit does not perform the switching while the zoom operation detecting unit detects driving of the zooming unit, even when detecting the operation of the manual operation member in the second direction. That is, when the manual operation member is not operated, the control unit is in the automatic focus mode in which the focusing unit is automatically driven by the automatic focus unit. When the manual operation member is operated in the second direction, the control unit comes to be in the manual focus mode achieving focus by the operation of the manual operation member in the second direction. However, when detecting the operation of the manual operation member in the second direction during the zoom operation in which the manual operation member is being operated in the first direction, the control unit comes to be in the automatic focus mode without switching to the manual focus mode. Therefore, unintentional switching from the automatic focus mode to the manual focus mode can be reliably prevented.

According to another aspect of the present invention, a camera system has a lens-barrel and a camera body to which the lens-barrel is attached. The lens-barrel includes a photographing optical system, a zooming unit for moving a variable power lens of the photographing optical system in an optical axis direction of the photographing optical system to vary a focal length, a focusing unit for moving a focusing lens of the photographing optical system in the optical axis direction to achieve focus, a manual operation member being operated in a first direction to thereby allow the zooming unit to be operable and operated in a second direction to thereby allow the focusing unit to be operable, the second direction being different from the first direction, an automatic focus unit for driving the focusing unit to focus the photographing optical system without operating the manual operation member, a zoom operation detecting unit for detecting the operation of the manual operation member in the first direction, a focus operation detecting unit for detecting the operation of the manual operation member in the second direction, and a control unit being capable of switching a way of achieving the focus from the automatic focus unit's operation to the manual operation member's operation in the second direction, when detecting that the manual operation member is operated in the second direction during the automatic focus unit's operation. The focus operation detecting unit can measure an operational amount of the manual operation member in the second direction, and while the zoom operation detecting unit detects driving of the zooming unit, the control unit does not perform the switching until the focus operation detecting unit determines that the operational amount of the manual operation member in the second direction has exceeded a predetermined amount. That is, while the zoom operation detecting unit detects driving of the zooming unit, the switching to the manual focus mode is not performed until the focus operation detecting unit determines that the operational amount of the manual operation member in the second direction has exceeded the predetermined amount. Therefore, as long as the operational amount of the manual operation member in the second direction does not exceed the predetermined amount, that is, as long as the operator does not operate the manual operation member intentionally, the switching to the manual focus mode does not occur. Thus, unintentional switching from the automatic focus mode to the manual focus mode can be effectively prevented.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Figure 1:
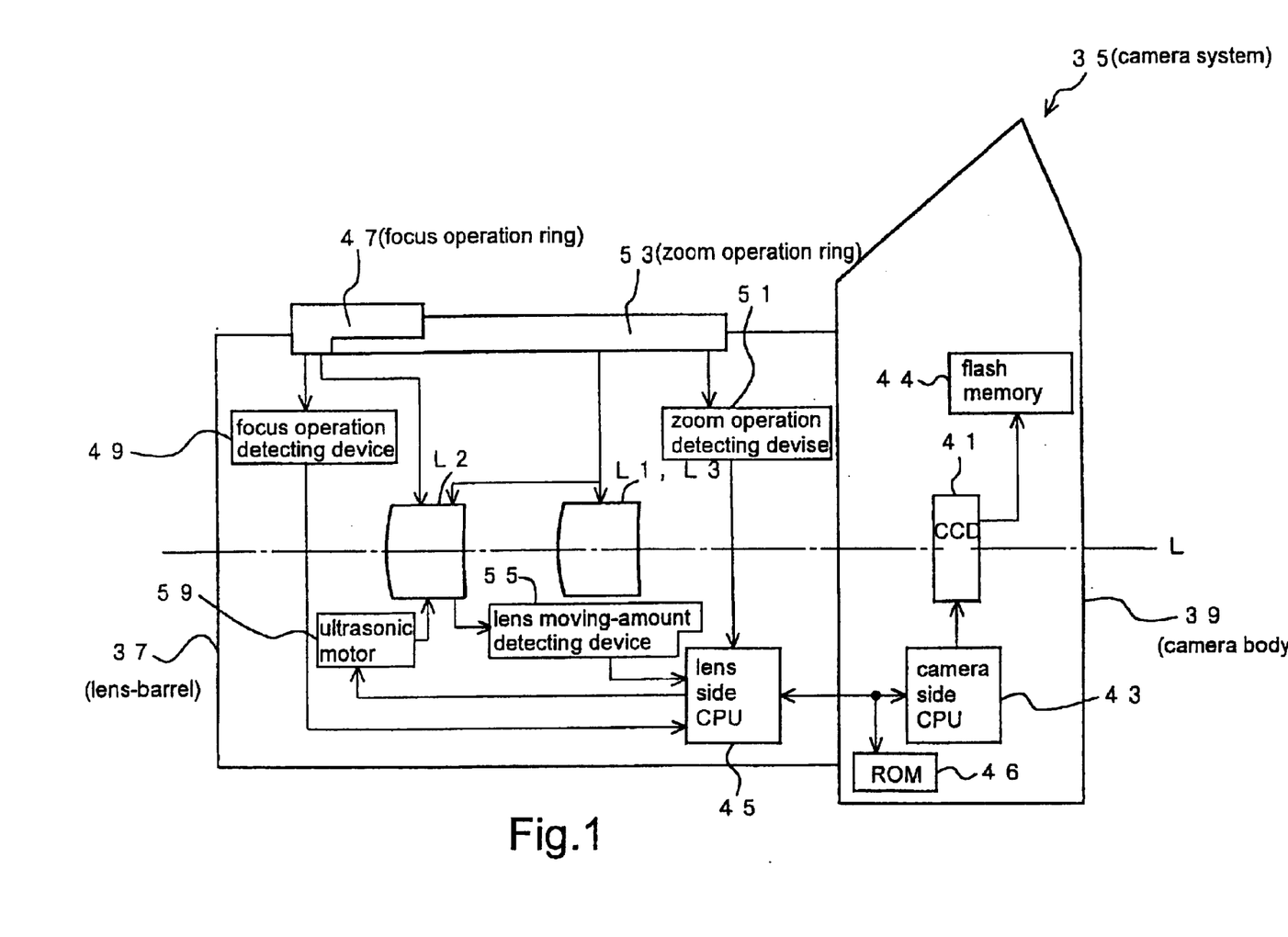
FIG. 1 is an explanatory diagram showing a camera system having a lens-barrel according to a first embodiment of the present invention.

Hereinafter, embodiments of the present invention will be described in detail with reference to the drawings.
(The First Embodiment)
FIG. 1 shows a camera system having a lens-barrel according to a first embodiment of the present invention. This camera system 35 has a lens-barrel 37 and a camera body 39.

The camera body 39 includes a CCD 41 for receiving light from a field of object, a camera side CPU 43 for performing various controls over the camera body 39, and a ROM 46 which stores a program for operating the camera body 39 and the like. In addition, the camera body 39 also includes a flash memory 44 for storing image data output from the CCD 41. The flash memory 44 is inserted in and ejected from a connector of receptacle type provided in the camera body 39.

On the other hand, the lens-barrel 37 includes lens groups of variable power lens, L1, L2, and L3, and a lens group of focusing lens, L2. These lens groups L1, L2, and L3, and the CCD 41 form a photographing optical system. Besides, the lens-barrel 37 includes a lens side CPU 45 which can communicate with the camera side CPU 43. An output signal from a focus operation detecting device 49 that is a focus operation detecting unit is input to the lens side CPU 45.

The focus operation detecting device 49 detects an operation of a focus operation ring 47 that is a manual operation member in a second direction. Here, the operation in the second direction is to rotate the focus operation ring 47 without changing the position to the optical axis, that is, rotating it about the optical axis L of the photographing optical system.

Moreover, an output signal from a zoom operation detecting device 51 which is a zoom operation detecting unit is input to the lens side CPU 45. The zoom operation detecting device 51 detects the operation of a zoom operation ring 53 in the first direction which constitutes the manual operation member with the focus operation ring 47 described above. Here, the operation in the first direction is to operate the zoom operation ring 53 in the direction along the optical axis L.

Then, when moving the zoom operation ring 53 in the direction along the optical axis L, the lens groups L1, L2, and L3, which are variable power lenses, move in the direction along the optical axis L. Meanwhile, when rotating the focus operation ring 47, the lens group L2 that are focusing lenses move in the direction along the optical axis L.

A lens moving-amount detecting device 55 measures an amount of moving of the lens group L2 in the direction along the optical axis L. An output signal from the lens moving-amount detecting device 55 is input to the lens side CPU 45. The lens side CPU 45 performs various control processing based on the signal input thereto. For example, under an automatic focus mode, it drives an ultrasonic motor 59 that is an automatic focus unit to move the lens group L2.

In addition, when detecting the rotation of the focus operation ring 47 even in the automatic focus mode in which the focus is achieved by driving the ultrasonic motor 59, the lens side CPU 45 switches from the automatic focus mode to a manual focus mode in which the focus is achieved by rotating the focus operation ring 47. In this embodiment, during a time when the zoom operation detecting device 51 detects the driving of the zoom operation ring 53, settings are made not to switch to the manual focus mode until the focus operation detecting device 49 determines that a rotational amount of the focus operation ring 47 has exceeded the predetermined amount. It is practically desirable to set the predetermined amount to fall within the range from 1-degree to 3-degree angle of rotation of the focus operation ring 47.

Figure 2:
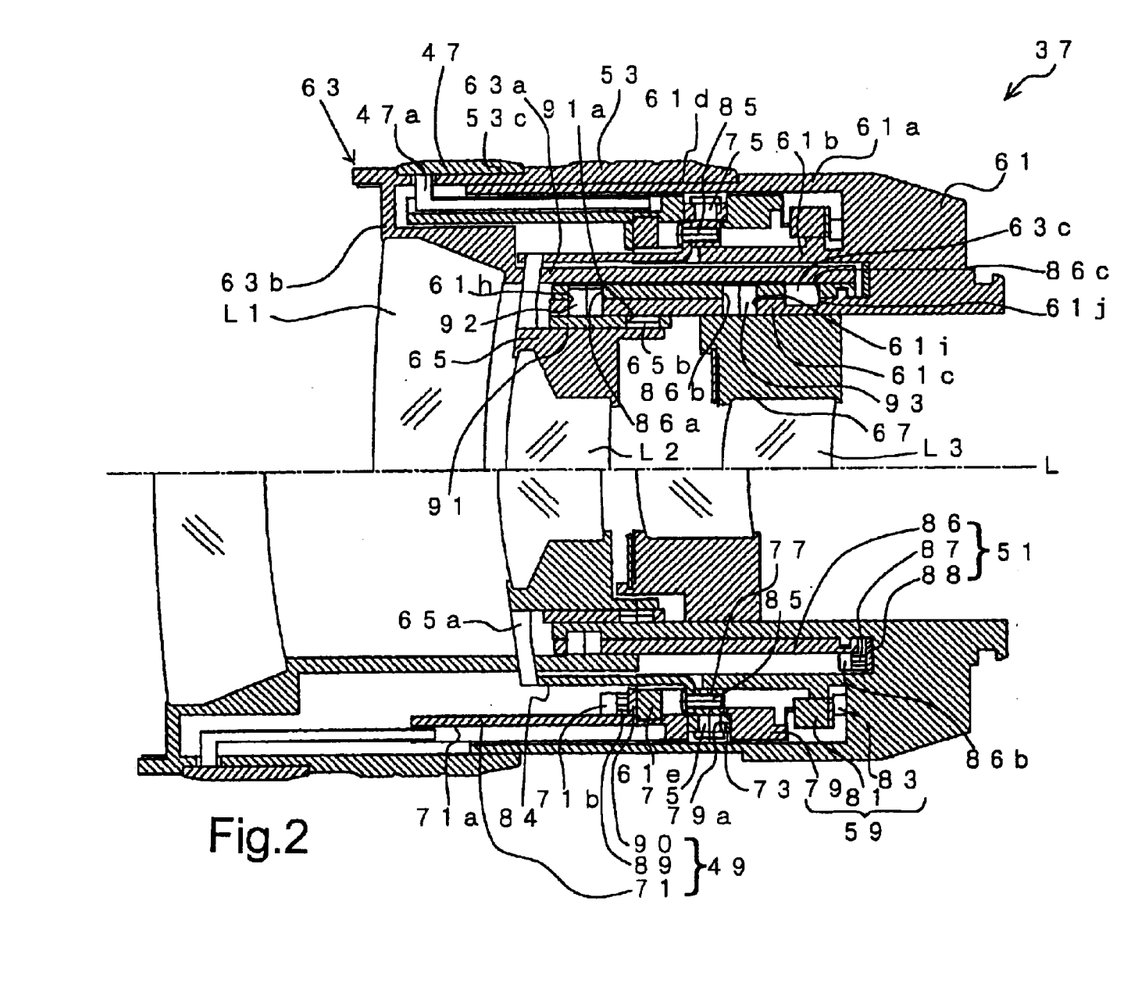
FIG. 2 is an explanatory diagram showing the detail of structure of the lens-barrel according to the first embodiment of the present invention.

FIG. 2 shows the details of the lens-barrel 37 described above.

The lens-barrel 37 includes a fixed tube 61 of cylindrical shape, and a movable tube 63 movably arranged over the fixed tube 61. Three tube portions 61a, 61b, and 61c which elongate from the fixed tube 61 in the direction along the optical axis L are integrally formed. In addition, on the movable tube 63, the zoom operation ring 53 and a lens holder portion 63b are integrally formed. Further, in a space between the tube portions 61b and 61c of the fixed tube 61, a tube portion 63a elongated from the lens holder portion 63b is inserted.

The lens group L1 is engaged in the lens holder portion 63b. A lens holder 65 of cylindrical shape in which the lens group L2 is engaged, and a lens holder 67 of cylindrical shape in which the lens group L3 is engaged, are inserted into the fixed tube 61.

The zoom operation ring 53 of the movable tube 63 is externally fitted over a periphery surface 61d of the fixed tube 61, being movable in the direction along the optical axis L. Besides, the focus operation ring 47 is externally fitted, rotatably, over a periphery surface 53c of the zoom operation ring 53 on the object side (left side in the Drawing).

A plurality of protruding portions 47a, which protrude from the focus operation ring 47 toward the optical axis L and then bend in the direction along the optical axis L, are arranged in a periphery direction of the focus operation ring with intervals of a predetermined angle. The protruding portions 47a of the focus operation ring 47 is engaged in an engagement hole 71a formed on a periphery of a coupling member 71 of cylindrical shape. On a mounting side of the coupling member 71 (right side in the Drawing), a rotating roller 73 of cylindrical shape is arranged.

The rotating roller 73 is provided on the periphery of a rotating ring 77 in a plurality of numbers. A roller holding axis 75 runs through the center of the rotating roller 73. The roller holding axis 75 is fixed to the periphery of the rotating ring 77. On the mounting side of the rotating ring 77, the ultrasonic motor 59 is arranged.

The ultrasonic motor 59 is composed of a rotor 79, stator 81, and a spring 83. The stator 81 is composed of a piezoelectric element and an elastic body with its surface elliptically moving by vibrations created by the piezoelectric element. The rotor 79 adjoins the stator 81 and is moved rotationally by the vibrations of the stator 81.

Meanwhile, a concatenated key 84 is arranged on the object side of the rotating ring 77, and an outside flange of the concatenated key 84 is fixed to the rotating ring 77 by a screw 85. A protruding portion 65a of the lens holder 65 is engaged with the end of the concatenated key 84 on the object side. A cam ring 86 of cylindrical shape is arranged between the tube portion 63a elongated from the lens holder 63b and the tube portion 61c of the fixed tube 61. It is only allowed for the cam ring 86 engaged with the periphery of the tube portion 61c of the fixed tube 61 to rotate about the optical axis L.

A movable member 91 of cylindrical shape is arranged between the tube portion 61c of the fixed tube 61 and the lens holder 65. The movable member 91 is engaged with the periphery of the lens holder 65. In addition, a cam groove 91a in which a pin 65b to be fixed to the lens holder 65 is engaged is formed on the movable member 91.

Cam grooves 86a, 86b, and 86c are formed on the cam ring 86 and sliding grooves 61h, 61i, and 61j are formed on the tube portion 61c of the fixed tube 61. A pin 92 to be fixed to the movable member 91 is engaged in the cam groove 86a and the sliding groove 61h. In addition, a pin 93 to be fixed to the lens holder 67 is engaged in the cam groove 86b and the sliding groove 61i. Moreover, a pin 63c to be fixed to the tube portion 63a of the movable tube 63 is engaged in the cam groove 86c and the sliding groove 61j.

In this embodiment, the zoom operation detecting device 51 is provided on the mounting side between the tube portions 61b and 61c of the fixed tube 61. The focus operation detecting device 49 is provided at the end of the tube portion 61b of the fixed tube 61.

Figure 3:
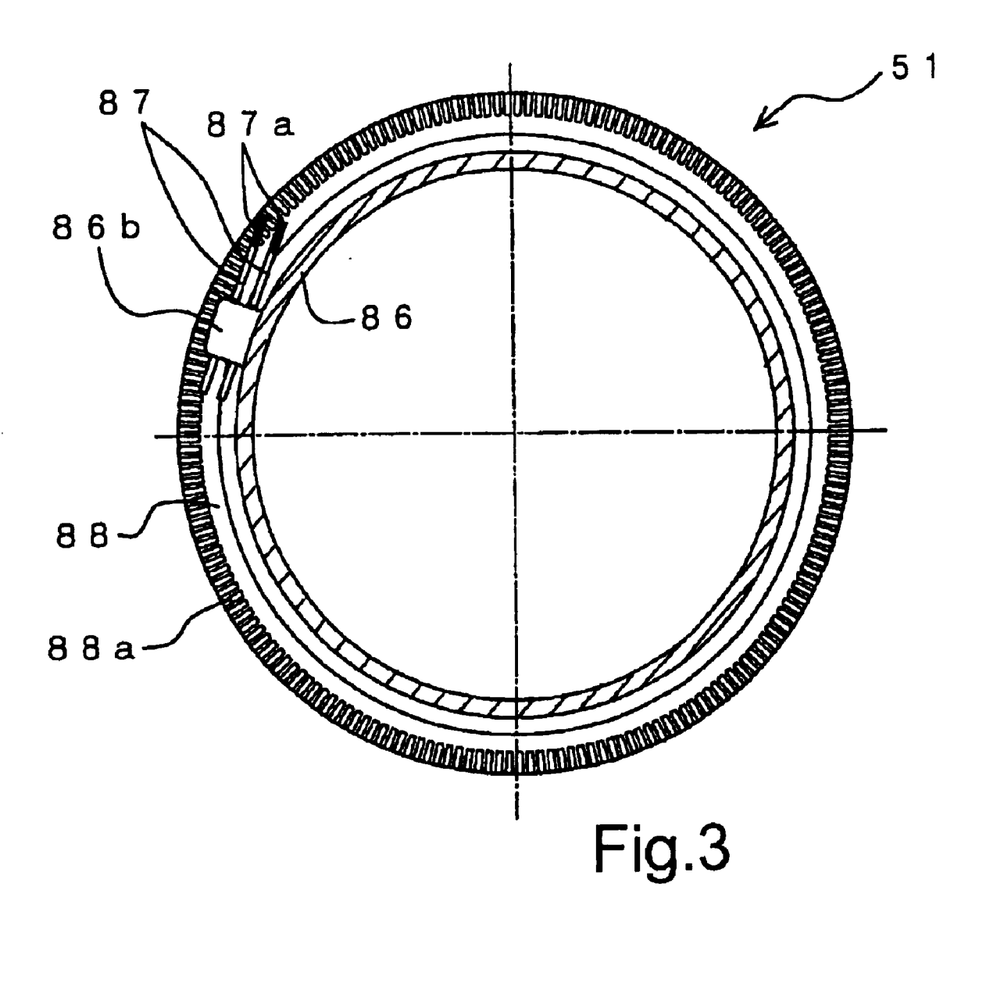
FIG. 3 is an explanatory diagram showing the detail of a zoom operation detecting device in FIG. 1.

As shown in FIG. 3, the zoom operation detecting device 51 includes brushes 87 attached to a brush attaching portion 86b fixed to the cam ring 86, and a printed-circuit board 88 of annular shape. Tip portions 87a of the brushes 87 are conductors made of substances including a carbon element, being pressured to the side of the printed-circuit board 88, and always keeping in contact with the printed-circuit board 88 even when the tip portions 87a have worn out. On the periphery of the printed-circuit board 88, a plurality of electrodes 88a is arranged at intervals of predetermined pitches to measure the amount of rotation of the cam ring 86.

In the zoom operation detecting device 51, since the brushes 87 rotate as the cam ring 86 rotates, the electrodes 88a make contact with the brushes 87 one after another, and thus generates a pulse each time the brushes and the electrodes 88a make contact with each other. Then, the amount of rotation of the cam ring 86 is measured by transmitting the pulse to the lens side CPU 45 (described in FIG. 1).

In this embodiment, the focus operation detecting device 49 has the same configuration as the zoom operation detecting device 51. That is, as shown in FIG. 2, there is provided a brush attaching portion 71b on the mounting side of inside perimeter of the coupling member 71, and there is provided a printed-circuit board 90 on a projecting portion 61e formed at the end of the tube portion 61b. In addition, the tips of brushes 89 to be fixed to the brush attaching portion 71b are being in contact with the electrodes of the printed-circuit board 90.

Hereinafter, description will be made specifically on the mechanical operation of the lens-barrel 37 described above.

First, the operation of the lens-barrel 37 in the automatic focus mode will be described.

In the lens-barrel 37 described above, when the stator 81 of the ultrasonic motor 59 is applied a voltage, vibrations occur in the stator 81. When vibrations occur in the stator 81, the rotor 79 rotates, and thus the rotating roller 73 that adjoins the rotor 79 rotates. The rotating roller 73 revolves about the optical axis L while auto-rotating around the roller holding axis 75, making the coupling member 71 as a guide way. The coupling member 71 is interlocked with the focus operation ring 47 to rotate integrally. Then, the rotating ring 77 rotates about the optical axis L at a speed one half of that of the rotating roller 73.

To the rotating ring 77, the concatenated key 84 is fixed, and at the tip of the concatenated key 84, the protruding portion 65a of the lens holder 65 is engaged. Thus, when the rotating ring 77 rotates, the lens holder 65 is rotated via the concatenated key 84 along the cam groove 91a formed on the movable member 91, and moves in the optical axis L direction as rotating.

Next, the operation of the lens-barrel 37 in the manual focus mode will be described.

In the manual focus mode, the rotor 79 and the stator 81 of the ultrasonic motor 59 are interlocked by a welding force of the screw 83 to rotate integrally.

In this state, when rotating the focus operation ring 47 about the optical axis L, the coupling member 71 rotates, and the rotating roller 73 revolves about the optical axis L while auto-rotating around the roller holding axis 75, making the rotor 79 as the guide way. Besides, the rotating ring 77 rotates about the optical axis L at a speed one half of that of the focus operation ring 47.

When the rotating ring 77 rotates, the lens holder 65 rotates about the optical axis L via the concatenated key 84, and moves in the direction along the optical axis L along the cam groove 91a of the movable member 91 while rotating.

Next, the operation of the lens-barrel 37 at the time of zooming will be described.

When zooming, the tube portion 63a elongated from the lens holder portion 63b of the movable tube 63 moves as an operator moves the zoom operation ring 53 in the direction along the optical axis L while holding it with his/her fingers. Then, the cam ring 86 rotates since the pin 63c provided on the tube portion 63a engages in the cam groove 86c of the cam ring 86 and the sliding groove 61j formed on the tube portion 61c of the fixed tube 61.

When the cam ring 86 rotates, the movable member 91 having the pin 92, which engages in the cam groove 86a, rotates about the optical axis L. When the movable member 91 rotates, the lens holder 65 having the pin 65b which engages in the cam groove 91a moves. In addition, the lens holder 67 having the pin 93 which engages in the cam groove 86b also moves.

As described above, when zooming is to be performed, the lens groups L1, L2, and L3 which engage in the lens holder portion 63b and the lens holders 65 and 67, respectively, are move in the direction along the optical axis L, and a variable power operation is performed.

Next, a switching operation from the automatic focus mode to the manual focus mode of the lens-barrel 37 will be described.

When rotating the focus operation ring 47 during the automatic focus operation, the focus operation detecting device 49 determines that the focus operation ring 47 has rotated. That is, when the coupling member 71 rotates by the rotation of the focus operation ring 47, the brushes 89 attached to the coupling member 71 by the brush attaching portion 71b make sliding contact with the electrodes 88a of the printed-circuit board 90, thereby generating pulses in accordance with a predetermined angle of rotational movement.

Then, the focus operation ring 47 rotates more than the predetermined amount and the pulses generated by contacts between the brushes 89 and the printed-circuit board 90 are measured the predetermined number, power supply for the stator 81 of the ultrasonic motor 59 is disconnected. When the power supply is disconnected, the rotor 79 and the stator 81 are integrated by their holding powers and come to be in the manual focus mode. Thus, the focusing by the focus operation ring 47 can be performed immediately.

Hereinafter, an overall operation of the camera system 35 shown in FIG. 1 will be described.

In the camera system 35 as shown in FIG. 1, under the automatic focus mode, an amount of moving of the lens group L2 required until the object is in focus is transmitted to the lens side CPU 45 on the side of the lens-barrel 37, by the camera side CPU 43 incorporated in the camera body 39.

The lens side CPU 45 of the lens-barrel 37 makes the lens group L2 move in the direction along the optical axis L by driving the ultrasonic motor 59, and measures the amount of moving of the lens group L2 based on the signal from the lens moving-amount detecting device 55. Then, the lens side CPU 45 stops the driving of the ultrasonic motor 59 when the amount of moving satisfies the required amount.

During the automatic focus operation, in the case where an operator who takes a picture rotates the focus operation ring 47, the focus operation detecting device 49 measures the amount of rotation and transmits information on the rotational amount to the lens side CPU 45.

When the amount of rotation of the focus operation ring 47 is less than the predetermined amount, the lens side CPU 45 continues the driving of the ultrasonic motor 59. On the other hand, the amount of rotation of the focus operation ring 47 is more than the predetermined amount, the lens side CPU 45 forbids the driving of the ultrasonic motor 59 and transmits to the camera side CPU 43 that the switching from the automatic focus mode to the manual focus mode has done. Because of this, the lens group L2 is movable only by rotating the focus operation ring 47.

Further, in the camera system 35 described above, when the operator holds the zoom operation ring 53 or holds the zoom operation ring 53 and the focus operation ring 47 together to perform the zooming operation, a pulse is generated by the zoom operation detecting device 51 and a pulse signal is output to the lens side CPU 45.

During the pulse is generated from the zoom operation detecting device 51, that is, during the zooming operation, even when the focus operation ring 47 rotates slightly and pulses are generated from the focus operation detecting device 49 less than or equal to a predetermined threshold number, the lens side CPU 45 determines that the operator unintentionally rotates the focus operation ring 47, keeps on supplying the power to the ultrasonic motor 59, and remains in the automatic focus mode.

When pulses which exceed the predetermined threshold number is generated from the focus operation detecting device 49, the lens side CPU 45 determines that the operator intentionally rotates the focus operation ring 47, stops supplying the power to the ultrasonic motor 59 immediately, and switches to the manual focus mode for enabling the focusing by the focus operation ring 47 at once.

The lens-barrel described above comes to be in the automatic focus mode without switching to the manual focus mode, when the rotational amount of the focus operation ring 47 less than or equal to the predetermined amount is measured during the zoom operation in which the zoom operation ring 53 is being operated in the direction along the optical axis L. Therefore, unintentional switching from the automatic focus mode to the manual focus mode during the zoom operation is reliably prevented.

In addition, since the ultrasonic motor 59 drives the lens group L2 of focusing lens, the automatic focus can be performed quickly with high accuracy.

Moreover, in the lens-barrel described above, the focus operation detecting device 49 and the zoom operation detecting device 51 can determine the amount of focus operation and the amount of zoom operation reliably with high accuracy, by measuring the pulses generated by contacts between the brushes 89 and the printed-circuit board 90, and between the brushes 87 and the printed-circuit board 88.

(The Second Embodiment)

Figure 4:
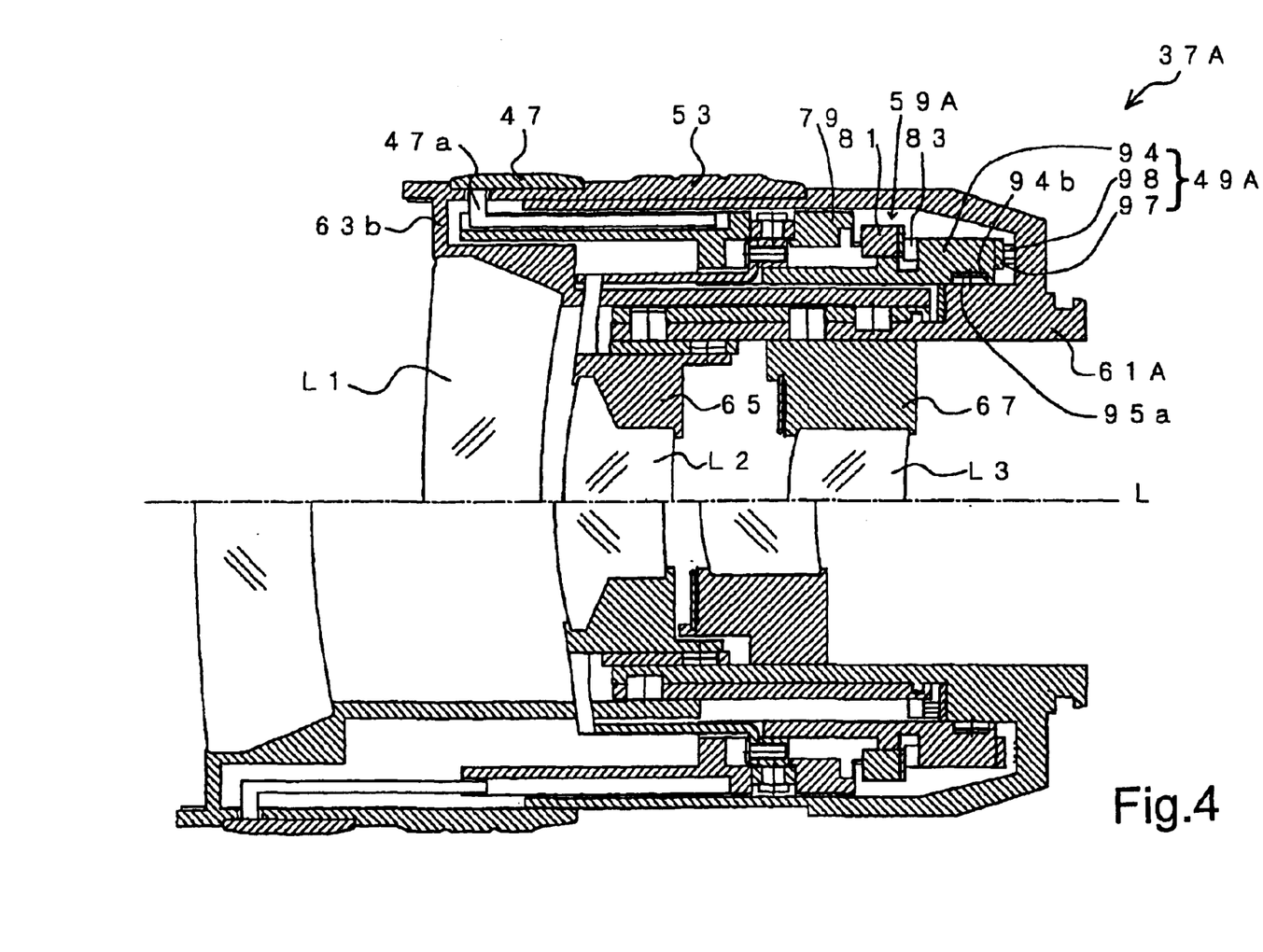
FIG. 4 is an explanatory diagram showing the lens-barrel according to a second embodiment of the present invention.

FIG. 4 shows a second embodiment of the lens-barrel according to the present invention.

In a lens-barrel 37A according to the second embodiment, an ultrasonic motor 59A is held to a fixed tube 61A as a unit, unable to move but rotatable in the optical axis L direction. That is, in this embodiment, the tube portion 61b of the fixed tube 61 according to the first embodiment is so configured that it is separated from the fixed tube 61 and arranged in the fixed tube 61A as a rotatable tube 94.

The rotatable tube 94 is rotatably arranged on the fixed tube 61A. An annular groove 94b is formed on the rotatable tube 94, and to engage a pin 95a of the fixed tube 61A in the annular groove 94b prevents movement of the rotatable tube 94 in the direction along the optical axis L.

At the outside of the rotatable tube 94, the rotor 79, the stator 81, and the spring 83 of the ultrasonic motor 59A is incorporated as a unit.

Additionally, in this embodiment, a focus operation detecting device 49 including a printed-circuit board 97 and brushes 98 is arranged between the mounting side of the rotatable tube 94 and the fixed tube 61A.

Meanwhile, a detailed explanation will be omitted in this embodiment for the same members as those in the first embodiment, applying the same reference numbers.

In this embodiment, during the automatic focusing, the stator 81 of the ultrasonic motor 59A is fixed and the rotor 79 is rotated. Meanwhile, during the manual focusing, the stator 81 and the rotor 79 are integrated by their holding powers, and the focusing is performed by rotating the rotatable tube 94 with the ultrasonic motor 59A. Then, the rotation of the rotatable tube 94 causes the printed-circuit board 97 of the focus operation detecting device 49A to rotate, and the rotational amount of the rotatable tube 94 is measured.

The lens-barrel 37A can also achieve similar effects and functions as those in the first embodiment.

(The Third Embodiment)

Figure 5:
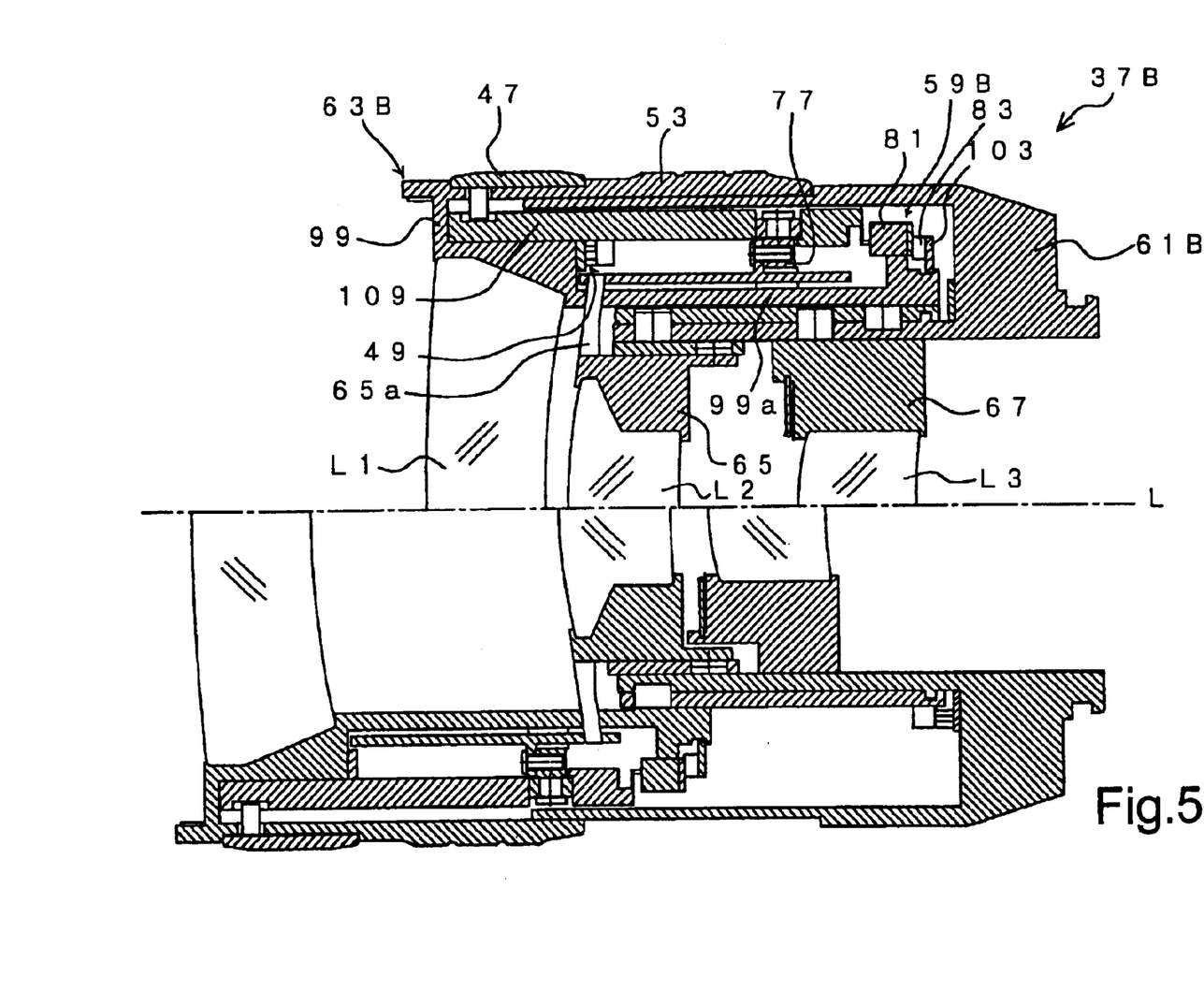
FIG. 5 is an explanatory diagram showing the lens-barrel according to a third embodiment of the present invention.

FIG. 5 shows a third embodiment of the lens-barrel according to the present invention.

In a lens-barrel 37B according to the third embodiment, each components of an ultrasonic motor 59B is mounted on a tube portion 99a of a movable tube 63B holding the lens group L1. That is, in this embodiment, the stator 81 of the ultrasonic motor 59B is arranged on the mounting side of the tube portion 99a of the movable tube 63B holding the lens group L1, and the spring 83 is arranged between the stator 81 and a fixed board 103. In addition, a coupling member 109 is rotatably engaged with the periphery of a lens holder portion 99 of the movable tube 63B and so configured that it moves in the optical axis direction with the movable tube 63B.

Meanwhile, a detailed explanation will be omitted in this embodiment for the same members as those in the first embodiment, applying the same reference numbers.

In this embodiment, the ultrasonic motor 59B and the coupling member 109 move in the direction along the optical axis L by zooming. The lens-barrel 37B can also achieve similar effects and functions as those in the first embodiment.

(The Fourth Embodiment)

Figure 6:
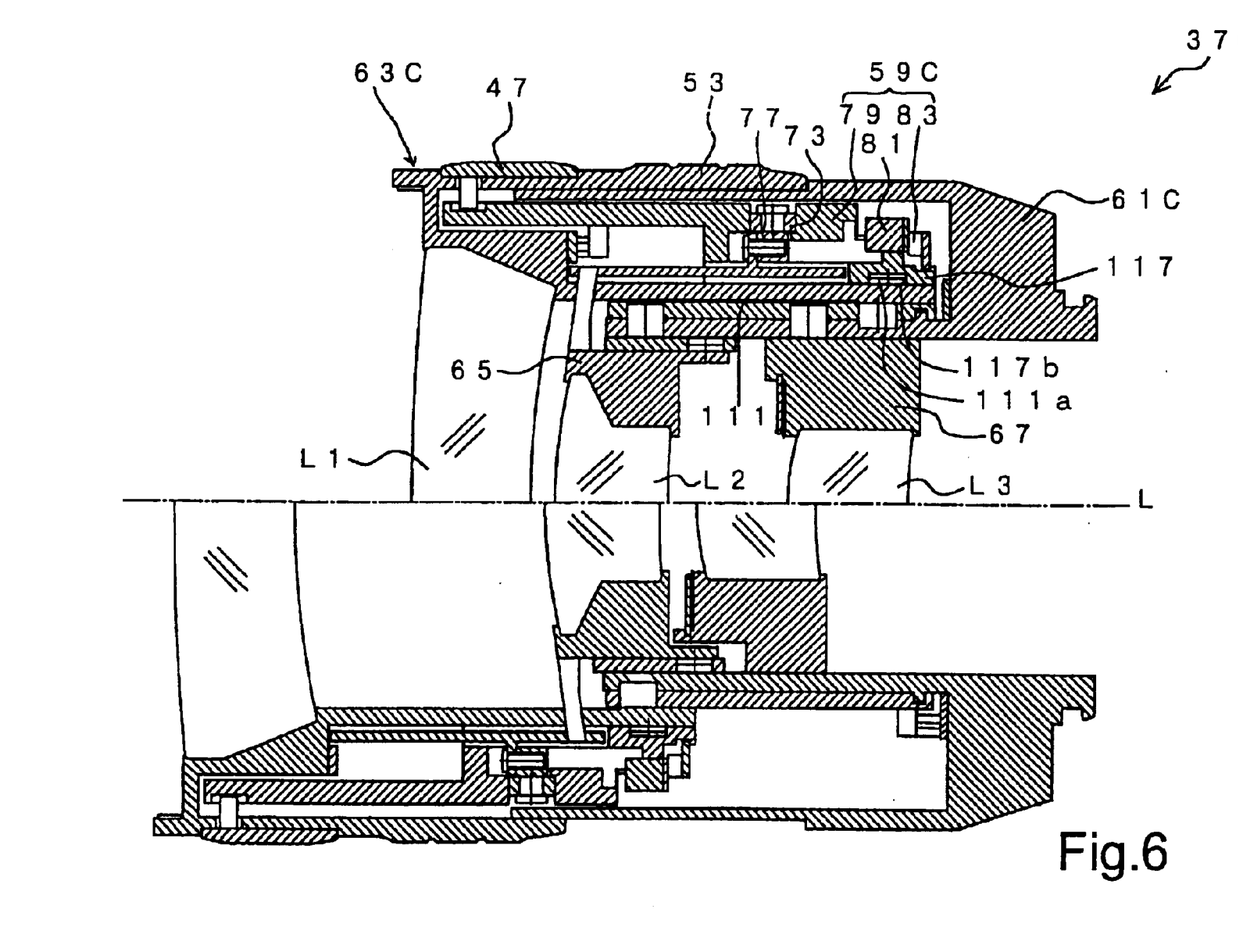
FIG. 6 is an explanatory diagram showing the lens-barrel according to a fourth embodiment of the present invention.

FIG. 6 shows a fourth embodiment of the lens-barrel according to the present invention.

In a lens-barrel 37C according to the fourth embodiment, an ultrasonic motor 59C is held as a unit to a tube portion 111 of a movable tube 63C holding the lens group L1, unable to move but rotatable in the optical axis L direction. That is, in this embodiment, the mounting side of the tube portion 99a of the movable tube 63B according to the third embodiment is so configured that it is separated therefrom and arranged outside of the tube portion 111 as a rotatable tube 117.

The rotatable tube 117 is rotatably arranged on the tube portion 111. On the rotatable tube 117, an annular groove 117b is formed. Engaging a pin 111a of the tube portion 111 into the annular groove 117b prevents the movement of the rotatable tube 117 in the optical axis direction. At the outside of the rotatable tube 117, the rotor 79, the stator 81, and the spring 83 of the ultrasonic motor 59C are incorporated as a unit.

Meanwhile, a detailed explanation will be omitted in this embodiment for the same members as those in the first embodiment, applying the same reference numbers.

In this embodiment, during the automatic focusing, the stator 81 of the ultrasonic motor 59C is fixed and the rotor 79 is rotated. Meanwhile, during the manual focusing, the stator 81 and the rotor 79 are integrated by their holding powers, and the focusing is performed by rotating the rotatable tube 117 with the ultrasonic motor 59C.

With this lens-barrel, similar effects and functions as those in the first embodiment can be also achieved.

Additionally, in the embodiments described above, an example is given of the configuration in which the zoom operation detecting device 51 and the focus operation detecting device 49 generate pulses by on/off of electrical connection. However, the present invention is not limited to such an embodiment. Instead, the present invention can be also applied to an optical method or a method capable of detecting a movement of a member in relation to the zoom operation or the focus operation. Moreover, the present invention may also be applied to a so-called zoom encoder or length encoder for detecting an absolute position of a zooming or focusing.

Further, in the embodiments described above, an example is given in which the automatic focus mode is adopted without being switched to the manual focus mode when determining that the rotational amount of the focus operation ring 47 is less than or equal to the predetermined amount during the zoom operation. However, the present invention is not limited to such an embodiment. Instead, in the present invention, the automatic focus mode may be adopted without being switched to the manual focus mode irrespective of the rotational amount, when the rotational operation of the focus operation ring 47 is detected during the zoom operation.

The invention is not limited to the above embodiments and various modifications may be made without departing from the spirit and scope of the invention. Any improvement may be made in part or all of the components.

What is claimed is:

1. A lens-barrel comprising:

a photographing optical system;

a zooming mechanism that moves a variable power lens of said photographing optical system in an optical axis direction of said photographing optical system to vary a focal length;

a focusing mechanism that moves a focusing lens of said photographing optical system in said optical axis direction to achieve focus;

a manual operation member which, when operated in a first direction allows said zooming mechanism to be operable, and when operated in a second direction allows said focusing mechanism to be operable, the second direction being different from said first direction;

an automatic focus driver that drives said focusing mechanism to focus said photographing optical system without operating said manual operation member;

a zoom operation detector that detects the operation of said manual operation member in said first direction;

a focus operation detector that detects the operation of said manual operation member in said second direction; and a controller that switches a way of achieving the focus from operation of the automatic focus driver to operation of the manual operation member in the second direction, when detecting that said manual operation member is operated in the second direction during operation of the automatic focus driver, wherein said controller does not perform the switching while said zoom operation detector detects the operation of said manual operation member in said first direction, even when the operation of said manual operation member in said second direction is detected.

2. The lens-barrel according to claim 1, wherein:
said first direction is said optical axis direction; and
said second direction is a direction in which the manual operation member rotates about the optical axis of the photographing optical system.

3. The lens-barrel according to claim 1, wherein said automatic focus driver drives said focusing mechanism by an ultrasonic motor which includes
a stator that includes a piezoelectric element and an elastic body having a surface that elliptically moves by vibrations created by said piezoelectric element, and
a rotor which adjoins said stator and is moved rotationally by the vibrations of said stator.

4. The lens-barrel according to claim 1, wherein:
said focus operation detector includes a printed-circuit board and brushes that make sliding contact with a plurality of electrical conductor patterns arranged on said printed-circuit board one after another, said electrical conductor patterns being arranged on a periphery of said printed-circuit board with intervals of predetermined pitches.

5. The lens-barrel according to claim 1, wherein:
said zoom operation includes a printed-circuit board and brushes that make sliding contact with a plurality of electrical conductor patterns arranged on said printed-circuit board one after another, said electrical conductor patterns being arranged on a periphery of said printed-circuit board with intervals of predetermined pitches.

6. A lens-barrel comprising:
a photographing optical system;
a zooming mechanism that moves a variable power lens of said photographing optical system in an optical axis direction of said photographing optical system to vary a focal length;
a focusing mechanism that moves a focusing lens of said photographing optical system in said optical axis direction to achieve focus;
a manual operation member which, when operated in a first direction allows said zooming mechanism to be operable, and when operated in a second direction allows said focusing unit-mechanism to be operable, the second direction being different from said first direction;
an automatic focus driver that drives said focusing mechanism to focus said photographing optical system without operating said manual operation member;
a zoom operation detector that detects the operation of said manual operation member in said first direction;
a focus operation detector that detects the operation of said manual operation member in said second direction; and
a controller that switches a way of achieving the focus from operation of the automatic focus driver to operation of the manual operation member in the second direction, when detecting that said manual operation member is operated in the second direction during operation of the automatic focus driver, wherein
said focus operation detector outputs a signal from which the controller can measure an operational amount of said manual operation member in said second direction, and
while said zoom operation detector detects the operation of said manual operation member in said first direction, said controller does not perform the switching until said controller determines that the operational amount of said manual operation member in said second direction has exceeded a predetermined amount.

7. The lens-barrel according to claim 6, wherein
said first direction is said optical axis direction; and
said second direction is a direction in which the manual operation member rotates about the optical axis of the photographing optical system.

8. The lens-barrel according to claim 6, wherein said automatic focus driver drives said focusing mechanism by an ultrasonic motor which includes
a stator that includes a piezoelectric element and an elastic body having a surface that elliptically moves by vibrations created by said piezoelectric element, and
a rotor which adjoins said stator and is moved rotationally by the vibrations of said stator.

9. The lens-barrel according to claim 6, wherein:
said focus operation detector includes a printed-circuit board and brushes that make sliding contact with a plurality of electrical conductor patterns arranged on said printed-circuit board one after another, said electrical conductor patterns being arranged on a periphery of said printed-circuit board with intervals of predetermined pitches.

10. The lens-barrel according to claim 6, wherein:
said zoom operation includes a printed-circuit board and brushes that make sliding contact with a plurality of electrical conductor patterns arranged on said printed-circuit board one after another, said electrical conductor patterns being arranged on a periphery of said printed-circuit board with intervals of predetermined pitches.

11. A camera system comprising a lens-barrel and a camera body to which said lens-barrel is attached, wherein said lens-barrel includes:
a photographing optical system;
a zooming mechanism that moves a variable power lens of said photographing optical system in an optical axis direction of said photographing optical system to vary a focal length;
a focusing mechanism that moves a focusing lens of said photographing optical system in said optical axis direction to achieve focus;
a manual operation member which, when operated in a first direction allows said zooming mechanism to be operable, and when operated in a second direction allows said focusing mechanism to be operable, the second direction being different from said first direction;
an automatic focus driver that drives said focusing mechanism to focus said photographing optical system without operating said manual operation member;
a zoom operation detector that detects the operation of said manual operation member in said first direction;
a focus operation detector that detects the operation of said manual operation member in said second direction; and
a controller that switches a way of achieving the focus from operation of the automatic focus driver to the manual operation member in the second direction, when detecting that said manual operation member is operated in the second direction during operation of the automatic focus driver, wherein
said controller does not perform the switching while said zoom operation detector detects the operation of said manual operation member in said first direction, even when the operation of said manual operation member in said second direction is detected.

12. A camera system comprising a lens-barrel and a camera body to which said lens-barrel is attached, wherein said lens-barrel includes:

a photographing optical system;

a zooming mechanism that moves a variable power lens of said photographing optical system in an optical axis direction of said photographing optical system to vary a focal length;

a focusing mechanism that moves a focusing lens of said photographing optical system in said optical axis direction to achieve focus;

a manual operation member which, when operated in a first direction allows said zooming mechanism to be operable, and when operated in a second direction allows said focusing mechanism to be operable, the second direction being different from said first direction;

an automatic focus driver that drives said focusing mechanism to focus said photographing optical system without operating said manual operation member;

a zoom operation detector that detects the operation of said manual operation member in said first direction;

a focus operation detector that detects the operation of said manual operation member in said second direction; and a controller that switches a way of achieving the focus from operation of the automatic focus driver of the manual operation member in the second direction, when detecting that said manual operation member is operated in the second direction during operation of the automatic focus driver, wherein said focus operation outputs a signal from which the controller can measure an operational amount of said manual operation member in said second direction, and while said zoom operation detector detects the operation of said manual operation member in said first direction, said controller does not perform the switching until said controller determines that the operational amount of said manual operation member in said second direction has exceeded a predetermined amount.

* * * * *